United States Patent
Cresens et al.

(10) Patent No.: US 8,855,359 B2
(45) Date of Patent: *Oct. 7, 2014

(54) METHOD OF REMOVING SPATIAL RESPONSE SIGNATURE OF COMPUTED RADIOGRAPHY DECTOR FROM IMAGE

(75) Inventors: Marc Cresens, Diest (BE); Herman Van Goubergen, Antwerp (BE)

(73) Assignee: Agfa HealthCare NV, Mortsel (BE)

( * ) Notice: Subject to any disclaimer, the term of this patent is extended or adjusted under 35 U.S.C. 154(b) by 0 days.

This patent is subject to a terminal disclaimer.

(21) Appl. No.: 13/978,973

(22) PCT Filed: Jan. 17, 2012

(86) PCT No.: PCT/EP2012/050594
§ 371 (c)(1),
(2), (4) Date: Jul. 10, 2013

(87) PCT Pub. No.: WO2012/098088
PCT Pub. Date: Jul. 26, 2012

(65) Prior Publication Data
US 2013/0287281 A1 Oct. 31, 2013

Related U.S. Application Data

(60) Provisional application No. 61/433,753, filed on Jan. 18, 2011.

(30) Foreign Application Priority Data

Jan. 18, 2011 (EP) .................................... 11151202

(51) Int. Cl.
G06K 9/00 (2006.01)
G06T 5/00 (2006.01)
H05G 1/70 (2006.01)

(52) U.S. Cl.
CPC ......... *G06T 5/00* (2013.01); *G06T 2207/10116* (2013.01); *G06T 5/002* (2013.01)
USPC .............................. 382/100; 382/264; 378/92

(58) Field of Classification Search
USPC ......... 382/100, 103, 106–107, 128–134, 162, 382/168, 173, 181, 189, 194, 221, 232, 254, 382/274–276, 291, 294, 305, 312; 378/4, 378/21, 28, 92; 250/363.02, 585; 356/479; 600/315
See application file for complete search history.

(56) References Cited

U.S. PATENT DOCUMENTS

| 5,315,507 A | 5/1994 | Nakajima et al. | |
|---|---|---|---|
| 2003/0103212 A1* | 6/2003 | Westphal et al. | 356/479 |
| 2005/0096515 A1* | 5/2005 | Geng | 600/315 |

(Continued)

FOREIGN PATENT DOCUMENTS

| EP | 0 823 691 B1 | 12/2003 |
|---|---|---|
| EP | 1 798 576 A2 | 6/2007 |

OTHER PUBLICATIONS

International Search Report, mailed Feb. 24, 2012 from PCT/EP2012/050594, filed Jan. 17, 2012.

*Primary Examiner* — Seyed Azarian
(74) *Attorney, Agent, or Firm* — Keating & Bennett, LLP

(57) ABSTRACT

Method of removing the spatial response signature of a detector from a computed radiography image by adaptively filtering and spatially warping the characteristic response signature of the detector prior to demodulation.

17 Claims, 1 Drawing Sheet

(56) References Cited

U.S. PATENT DOCUMENTS

| | | |
|---|---|---|
| 2006/0210135 A1 | 9/2006 | Kanegae |
| 2007/0036410 A1* | 2/2007 | Ida et al. ............... 382/128 |
| 2008/0095407 A1* | 4/2008 | Stewart et al. ............... 382/106 |
| 2009/0078874 A1* | 3/2009 | Schweizer et al. ....... 250/363.02 |
| 2011/0073787 A1* | 3/2011 | Berger et al. ............... 250/585 |

* cited by examiner

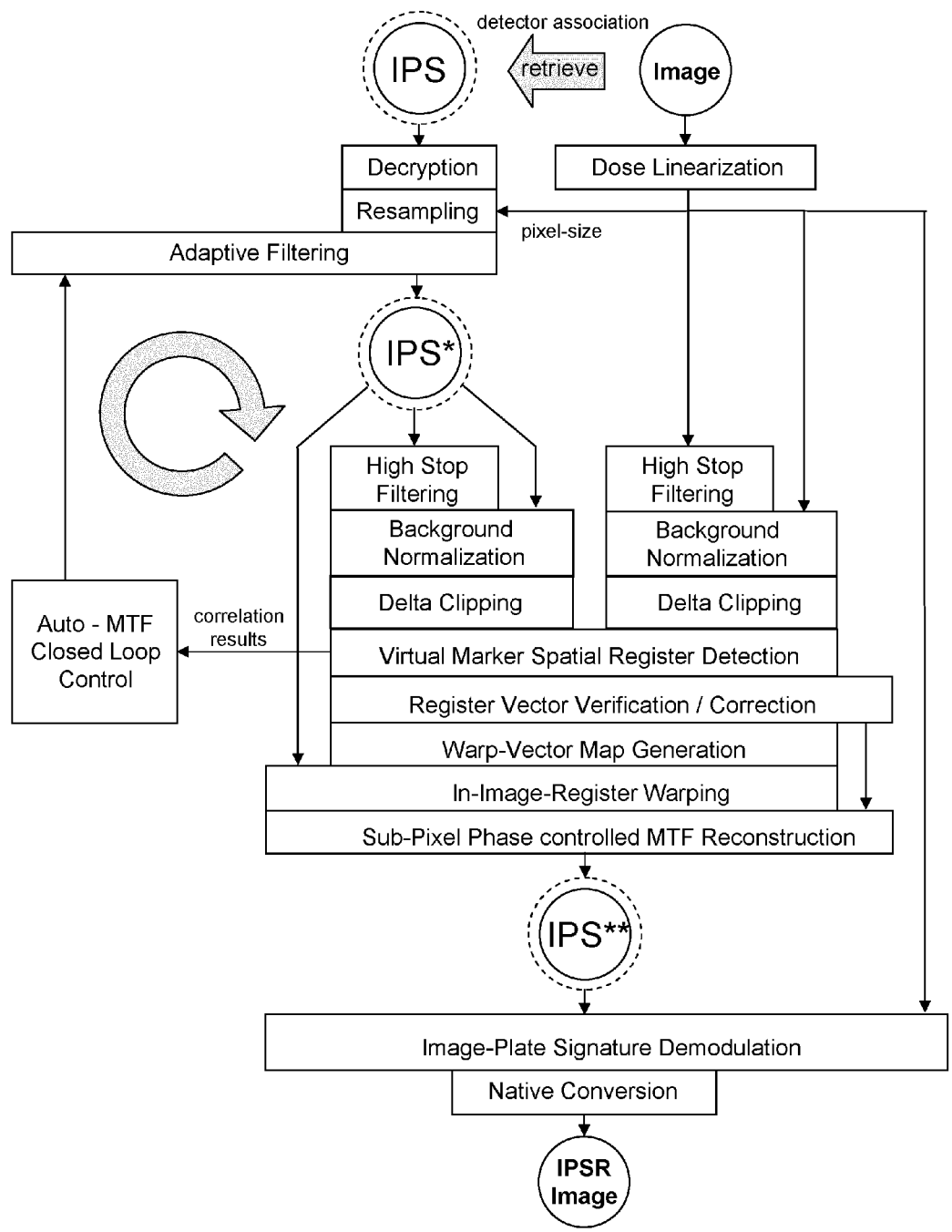

METHOD OF REMOVING SPATIAL RESPONSE SIGNATURE OF COMPUTED RADIOGRAPHY DECTOR FROM IMAGE

FIELD OF THE INVENTION

The present invention relates to computed radiography. The invention more particularly relates to a method for removing the spatial response signature of a photo-stimulable phosphor detector from an image acquired by means of that detector.

BACKGROUND OF THE INVENTION

Computed radiography (CR) performance is tightly coupled to the overall image quality and detection capabilities of the entire image acquisition, processing and display chain. For diagnosis or during technical image quality testing patient- or target (phantom)-images are created on an intermediate storage medium, called image plate or detector. During exposure the image plate traps the locally impinging x-rays and stores the latent shadow image until it is scanned and converted into a digital image by a read out device (digitizer).

Physical process limitations and tolerances during image plate manufacturing generate local sensitivity variability across the detector surface. Storage phosphor based (amorphic or crystal) CR detectors are multi-layered structures composed of a substratum, an adhesion layer, a conversion and storage layer and a protective sealing layer. Each of these functional layers and their interfaces may suffer from various levels of typical imperfections, blemishes and artifacts causing locally deviating image plate sensitivity. The medium to high spatial frequency components of the relative sensitivity distribution across a detector's surface reflect the image plate structure (IPS), the detector's unique signature.

A CR-image should closely reflect the patient's or object's x-ray shadow information. Since the detector's local sensitivity is the multiplicative factor controlling the conversion of the latent dose information into the image signal, the IPS is inevitably water-marked into each CR image acquired from it. Local image plate sensitivity variability can by consequence lead to diagnostic image quality loss because the relevant patient information is polluted by the detector's IPS. Like dose-related quantum (photon) noise and digitizer noise, the IPS is a detector-related, disturbing noise source which diminishes the Detective Quantum Efficiency (DQE) of the CR system. Excessive IPS thus reduces the radiologist's reading comfort and confidence level since it becomes more difficult to discern subtle but important image information.

Mammography, an image quality wise highly demanding CR market, imposes tough requirements to the magnitude and spatial extent of the detector's sensitivity variability distribution. Stringent IPS control is key to preserve a sufficient visibility of tiny objects like micro-calcifications and the sharp delineation of subtle, medium to large structures inside the breast tissue. Image plate artifacts, isolated sensitivity disturbances, also part of a detector's characteristic IPS, are of major concern in diagnostic image viewing since their distinct presence can potentially hide pathology and hamper the reading of the surrounding image area. Excessive detector sensitivity variability can easily generate costly yield loss in detector manufacturing.

It is an object of the present invention to improve the diagnostic image quality and expand the detection capabilities of a radiographic image system by removing the x-ray detector's characteristic spatial response signature from a radiographic image.

SUMMARY OF THE INVENTION

The above-mentioned aspect is realised by a method having the specific features set out in claim 1.

Specific features for preferred embodiments of the invention are set out in the dependent claims.

A detector's signature is defined as the relative, medium to high spatial frequency components of a computed radiography detector's characteristic sensitivity.

The method of the present invention will enable the removal of an image plate's disturbing IPS noise from diagnostic CR images to obtain an unprecedented image quality level and increased detection capabilities (DQE).

The method of the present invention is generally implemented in the form of a computer program product adapted to carry out the method steps of the present invention when run on a computer. The computer program product is commonly stored in a computer readable carrier medium such as a DVD. Alternatively the computer program product takes the form of an electric signal and can be communicated to a user through electronic communication.

IPS removal will indirectly (improved image quality and DQE) weaken the need for tough IPS acceptance criteria in detector QC and this leads to a better yield in CR image plate manufacturing.

Further advantages and embodiments of the present invention will become apparent from the following description and drawing.

BRIEF DESCRIPTION OF THE DRAWINGS

FIG. 1 is a flow chart illustrating the different steps of the image plate signature removal method of the present invention.

DETAILED DESCRIPTION OF THE INVENTION

Below a specific embodiment of the process of removing an image plate's (also called 'CR detector') spatial response signature from a radiographic image recorded on that image plate is described.

The image plate used in computed radiography typically comprises a photo-stimulable phosphor.

Examples of suitable detectors comprising a photo-stimulable phosphor are described e.g. in European patent application 1 818 943 and European patent application 1 526 552.

Diagnostic Image Generation

The image generation process in its most general formulation comprises the steps of generating a diagnostic image by exposing a patient or object to radiation, capturing the x-ray shadow on a computed radiography detector, preferably line-wise scanning the exposed detector by means of light, e.g. laser light and by digitizing the scanned image.

Examples of a scanning and digitizing method and apparatus (also called digitizer or read out apparatus) are well known in the art. The apparatus generally comprises means for line-wise scanning (main scan direction) a computed radiography detector that has been exposed to penetrating irradiation (e.g. x-rays) with stimulating light (e.g. according to the flying spot scanning principle) and means for transporting the detector in a second direction substantially perpendicular to the main scanning direction (sub-scan or slow scan transport direction) to obtain a two-dimensional scan. Upon stimulation the radiography detector emits image-wise modulated light. Means (such as a photomultiplier) are provided to detect this image-wise modulated light and convert it into an electric image signal. The electric image signal is next digitized by an analog-to-digital convertor.

Several steps (some of which are optional) of the present invention are described hereinafter. It will be clear to the man skilled in the art that the numerical values which are disclosed are only given for illustrative purposes and do not limit the present invention.

Dose-Linear Signal Conversion

The digitizer's characteristic dose response curve is used to convert the image signals from the native format obtained by scanning and digitizing into dose-linearized signals (if the native format is not dose-linear) because the intended removal of an image plate's structure (IPS) from CR (computed radiography) images requires a multiplicative demodulation.

This first step in image preparation is performed for the diagnostic image.

Image Plate Signature Retrieval

The unique image plate signature (IPS) of the detector used during diagnostic image acquisition is retrieved locally or from an IPS repository by means of the detector's identification data, associated with the diagnostic image.

A method of determining the spatial response signature of a two dimensional x-ray detector comprising a photostimulable phosphor is described in EP 2 407 106. The method comprises the step of generating a flat field image by homogeneously exposing the detector to radiation and scanning the homogeneously exposed detector and by digitizing the scanned image. Next a low-pass filtered version of said flat field image is generated. Finally the flat field image is background demodulated by means of corresponding pixel values in said low-pass filtered version.

Image Plate Signature Decryption

The IPS might require decryption (if it was stored with encryption) to convert it into the dose-linear, normalized relative detector-sensitivity format.

Image Plate Signature Resampling

If the retrieved IPS and the diagnostic image would have different pixel sizes, the IPS must be resampled to match the pixel-size of the diagnostic image first.

Image Plate Signature Adaptive Filtering (Sharpness Matching)

After image plate assembly and before shipping the detector along with its unique associated IPS (IPS files can be web-distributed too) to the hospital a task-dedicated digitizer is used during image plate structure characterization in manufacturing.

During diagnostic imaging a different (and possibly even a different type of) digitizer is used in hospitals world-wide.

Due to sharpness tolerances between individual digitizers, the end resulting sharpness (MTF) of a detector's spatial sensitivity distribution as hidden in the dose-linear, diagnostic image may differ from the sharpness representation as stored in the detector-associated IPS. For optimal IPS removal results the sharpness of the IPS must be matched with the sharpness as present in the diagnostic image. This matching-process is performed by a closed loop control system which successively alters the characteristics of an adaptive filter until the sharpness-filtered IPS* best correlates with the IPS as present in the diagnostic image. The results calculated from the in-register cross-correlation of the adaptively filtered signature and the CR-image are used as sensitive feedback signals to measure the pursued sharpness match. Based on these signals the control system determines the most optimal filter settings to reach the best possible sharpness-match. In one embodiment the feedback signals from the various marker points in the diagnostic image are weighed differently. The cross-correlation results from image-areas outside the skinline in a mammography image are disregarded and more feedback impact is given to the central and chest-wall region of the breast-image.

High Stop Filtered Background Normalization

Next, a high-stop filtered version of the diagnostic image is generated and the diagnostic image is background normalized by means of corresponding pixel values in said high-stop filtered version.

A pixel-centered 5×5 pixels square background average kernel high stop filter (low pass filter) demodulates the low to medium-low spatial frequency image-components by dividing the pixel signals by their background average signals and by scaling that result with a fixed factor to obtain the desired normalized signal level.

The 5×5 pixels kernel size is given for illustrative purposes and does not limit the present invention.

This background normalization step is performed for the dose-linear diagnostic image and for its associated IPS* sharpness-matched detector-signature.

Spatial correlation disturbing, low and medium spatial frequency image-components are generally extensively present in diagnostic images. These are thus effectively removed and what remains are the higher spatial frequency components from the patient-shadow and from the subtly present, hidden detector signature. This enables a sub-pixel accurate determination of the spatial register between the background normalized diagnostic image and its IPS* by means of virtual marker based spatial correlation mainly steered by the fine-grained, local, noisiness of the detector's relative sensitivity distribution.

Delta Clipping

Virtual marker correlation acts on two sets of spatially associated neighbouring pixel clusters located in the background normalized diagnostic image and in the IPS*.

Polluting surface particles in the diagnostic image can generate high signal contrasts and these can, if passed unsuppressed, ruin the accuracy of the virtual marker register determination completely if the IPS would locally contain similarly looking (size, shape, modulation) features too.

Signal delta clipping limits the relative maximum deviation of the local pixel signal to +/−1% of its local background to prevent this. This +/−1% clip level is given for illustrative purposes and does not limit the present invention.

Signal delta clipping is performed for the background normalized diagnostic and IPS* images.

Virtual Marker Frame Definition

A virtual marker grid (or mesh) spanning the majority of the detector's surface is defined in the delta clipped diagnostic image acting as the spatial reference image from now on.

Using a bidirectional grid-pitch of 100 pixels at a 50 micron pixel-size a 5 mm maze-size grid of invisible but accurately detectable landmarks is generated in the reference image.

This creates a 57×45 (2565) virtual marker array for a 30×24 cm CR cassette format (a cassette carrying a CR detector) and enables a tight local control of each view's spatial distortions.

The numerical data are given for illustrative purposes and are not limitative for the present invention.

Virtual markers can also be replaced by physical markers if the diagnostic application concerned allows the use of physical markers.

Spatial Register Vector Calculation

Virtual marker pixel-clusters, centered about the mesh-points within the spatial reference (diagnostic) image are individually sub-pixel correlated with their corresponding, similarly sized, pixel clusters arranged within their slightly larger, corresponding register vector search regions in the delta clipped IPS* image. This way local register vectors are detected with a sufficient surface resolution by sub-pixel interpolated maximum correlation based on the detector's hidden IPS between the IPS* and the diagnostic image. The local register vectors found are arranged in an IPS* map and by concept the register vector map of the reference image would be filled with zero vectors.

Multiple, virtual marker based correlations are performed at various spatially distributed locations across the detector's surface and the set of correlation maxima obtained is used as feedback signals to determine the parameters for the adaptive IPS filtering performed by the embedded sharpness matching control system.

Register Vector Map Verification and Corrections

The register vector map containing the in sub-pixel spatial register information for the IPS* with the reference image is cross-checked for local unexpected virtual marker correlation abnormalities. This is done by calculating the interpolated or extrapolated (virtual marker grid borders and corners) average register vector based on the immediately surrounding register vectors. The locally calculated register vector is replaced by its surrounding vector average if its vector-difference exceeds a certain sub-pixel distance. The entire IPS* register vector map is subjected to this verification and correction process.

Warp-Vector Map Generation

Once the virtual marker register vector map has been checked and possibly modified, the local register vectors, relating each of the diagnostic image (acting as register reference) pixels to their sub-pixel spatially associated points in the IPS*, are created. Interpolation and/or extrapolation of the available register vector map data generates this image-wide map of sub-pixel accurate spatial register vectors at pixel resolution.

This map uniquely defines the geometric transformation model which is required to distort (warp) the IPS* such that its pixels physically match (at the image plate's detector layer) with the corresponding diagnostic image pixels.

In Image Register Warping

Based on the sub-pixel accuracy register vector available for each diagnostic image pixel, the in spatial register signal reconstruction is performed by using the pixel signals from the correlated background normalized and clipped IPS* image. Register vector steered interpolation of the correlated image's surrounding pixel signal computes the in register signal. This way the IPS* is replaced by its in spatial register (with the diagnostic image) computed image. The pixel signals of that warped IPS* image are thus calculated at the same physical position at the surface of the detector as the signals from their corresponding pixels in the diagnostic image.

Sub-Pixel Phases Controlled MTF Reconstruction

The background normalized and clipped IPS* has been warped according to its image-wide register vector map based on its locally surrounding original pixel data and its bidirectional sub-pixel phases corresponding with the actual interpolation (resampling) point, indicated by the spatial register vector. A certain amount of sharpness loss is inherent to this image resampling (warping) process and the resulting, bidirectional image-blur depends on the interpolation point's bidirectional, sub-pixel phase's magnitudes. The closer the interpolation point is located to the nearest original image pixel in a certain image direction, the sharper the warped image in that direction will be. The sharpness loss is at maximum when the interpolation point is located in the center of the four surrounding original data pixels at identical 0.5 pixel phases in both main image directions. Modulation Transfer Function (sharpness) reconstruction extracts the bi-directionally decoupled, sub-pixel phases from the verified and corrected register vector map and distils an anisotropic convolution filter kernel from it to re-establish the sharpness of the warped image at the level before warping. The gain of this sharpness reconstruction filter process is near unity and this reconstruction process generates the IPS** image.

Image Plate Signature Demodulation

The in-diagnostic-image warped pixels of the IPS contain the local relative detector sensitivity distribution. By dividing the dose-linear diagnostic image with this near unity IPS data a new image signal, simulating the local pixel response for a uniform dose-sensitivity across the entire detector-surface, is created. This way the disturbing effects of the detector's non-uniform sensitivity distribution are effectively removed from the diagnostic image.

Saturated CR-image pixels are just passed onto the signature-removed CR image without demodulation to avoid the inappropriate burn in of the detector's relative sensitivity distribution in smooth, saturated image regions. The IPS** demodulated signals are clipped to the saturated signal level if needed.

Native Conversion

Unless the diagnostic image pixel signals were already in the dose-linear format the IPS removed image is converted into its native signal format to finalize the process of image plate signature removal.

The invention claimed is:

1. Method of removing the spatial response signature of a two dimensional x-ray detector comprising a photostimulable phosphor from a computed radiography (CR) image, the method comprising:
    retrieving the spatial response signature of a CR-detector used during the acquisition of said CR image,
    in-spatial-register demodulating said CR image by dividing pixel values of said CR image by corresponding values in the retrieved and spatially remapped signature, values of the spatially remapped signature being obtained by warping said spatial response signature according to a geometric transformation model, wherein a read out device used for reading said CR-image out of the detector and a read out device used during determination of the spatial response signature of the detector are different devices, re-sampling the retrieved signature to match the pixel size of the signature with that of the CR image.

2. A method according to claim 1 wherein said CR-image and said signature are background-normalised by pixel-wise dividing the CR image by a low pass filtered version of said CR image and by pixel-wise dividing the signature by a low pass filtered version of said signature.

3. A method according to claim 1 wherein the CR-image and the extracted signature are clipped if the signals representing the CR image or the extracted signature deviate more than a given threshold-percentage from the corresponding background-demodulated signals.

4. A method according to claim 1 wherein said geometric transformation model is calculated by cross-registering a multitude of spatially distributed markers arranged on the surface of said detector and present in both said CR-image and in the retrieved signature.

5. A method according to claim 4 wherein said markers are virtual markers which consist of a cluster of neighboring pixels arbitrarily defined within said CR-image.

6. A method according to claim 5 wherein for each marker an in-spatial-register location is calculated by cross-correlating pixel-cluster data values associated with said marker in said CR-image with a multitude of physically neighboring, bi-directionally pixel-shifted, pixel-cluster data value sets in said signature to obtain a set of cross-correlation results.

7. A method according to claim 6 wherein each marker's in-register location is determined with sub-pixel accuracy by interpolating said set of cross-correlation results.

8. A method according to claim 4 wherein a bidirectional marker-grid is defined in said CR-image.

9. A method according to claim 8 wherein interpolation or extrapolation of marker-grid's vector-data representing a geometric transformation between the location of a marker grid element in said CR image with its corresponding location in said signature is used to compose a geometric transformation model which links each individual CR-image pixel to its physically associated location in the retrieved signature.

10. A method according to claim 9 wherein the retrieved signature is warped to correspond pixel-wise with the CR-image by interpolating or extrapolating the signature data at the positions indicated by said geometric transformation model.

11. A method according to claim 10 wherein bi-directionally decoupled, sub-pixel phases defined by said vector data are extracted and an anisotropic convolution filter kernel is distilled from it to re-establish the sharpness of the warped signature at the level before warping.

12. A method according to claim 1 wherein the retrieved signature passes an adaptive filter to compensate for modulation transfer function differences and temporal drift of the CR-read out devices used.

13. A method according to claim 12 wherein the behavior of the in-register cross-correlation feedback between the set of adaptively filtered signatures and the CR-image determines the filter parameters of said adaptive filter.

14. A method according to claim 13 wherein multiple, spatially distributed regions of interest in the CR-image and in the adaptively filtered signatures contribute to the cross-correlation feedback.

15. A method according to claim 14 wherein feedback contributions of said multiple regions-of-interest are weighed differently.

16. A method according to claim 15 wherein a weight attributed to said contribution of a region of interest depends on the diagnostic importance of said region of interest inside said CR-image.

17. A non-transitory computer readable medium comprising computer executable program code adapted to carry out a method of removing the spatial response signature of a two dimensional x-ray detector comprising a photostimulable phosphor from a computed radiography (CR) image, when run on a computer, the method comprising:

retrieving the spatial response signature of a CR-detector used during the acquisition of said CR image, wherein a read out device used for reading said CR-image out of the detector and a read out device used during determination of the spatial response signature of the detector are different devices, in-spatial-register demodulating said CR image by dividing pixel values of said CR image by corresponding values in the retrieved and spatially remapped signature, values of the spatially remapped signature being obtained by warping said spatial response signature according to a geometric transformation model, and re-sampling the retrieved signature to match the pixel size of the signature with that of the CR image.

* * * * *